US009490888B2

(12) United States Patent
Cui et al.

(10) Patent No.: US 9,490,888 B2
(45) Date of Patent: *Nov. 8, 2016

(54) CODEBOOK BASED CHANNEL INFORMATION FEEDBACK METHOD, DEVICE AND SYSTEM

(71) Applicant: SONY CORPORATION, Tokyo (JP)

(72) Inventors: Qimei Cui, Beijing (CN); Shiyuan Li, Beijing (CN); Xiaofeng Tao, Beijing (CN); Chao Wang, Beijing (CN); Xianjun Yang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,351

(22) Filed: Mar. 12, 2015

(65) Prior Publication Data
US 2015/0200719 A1 Jul. 16, 2015

Related U.S. Application Data

(62) Division of application No. 13/522,374, filed as application No. PCT/CN2011/070821 on Jan. 30, 2011, now Pat. No. 9,007,995.

(30) Foreign Application Priority Data

Feb. 11, 2010 (CN) .......................... 2010 1 0111774

(51) Int. Cl.
H04B 7/06 (2006.01)
H04L 1/00 (2006.01)
(Continued)

(52) U.S. Cl.
CPC .......... H04B 7/0639 (2013.01); H04B 7/0452 (2013.01); H04B 7/0456 (2013.01);
(Continued)

(58) Field of Classification Search
CPC .. H04B 7/0456; H04B 7/063; H04B 7/0639; H04B 7/0617; H04B 7/0452; H04B 7/0469; H04B 7/0478; H04B 7/0626; H04B 7/0632; H04B 7/0413; H04B 7/043; H04B 7/0486; H04B 7/06; H04B 7/0647
See application file for complete search history.

(56) References Cited

U.S. PATENT DOCUMENTS 8,811,520 B2 * 8/2014 Kim .................. H04B 7/063
370/334
2007/0249401 A1 10/2007 Kim et al.
(Continued)

FOREIGN PATENT DOCUMENTS

CN 101496439 7/2009
CN 101789849 7/2010

OTHER PUBLICATIONS

3GPP TSG-RAN WG1 #59bis R1-100454, "Dynamic SU/MU Switching with Multi-Rank PMI/CQI Feedback," Texas Instruments, Total 5 Pages, (Jan. 18-22, 2010).
(Continued)

Primary Examiner — Hirdepal Singh
(74) Attorney, Agent, or Firm — Oblon, McClelland, Maier & Neustadt, L.L.P

(57) ABSTRACT

A codebook based channel information feedback method, device and system are provided in the present invention. The codebook based channel information feedback method includes: measuring, by a terminal in a communication system, a parameter of a downlink channel between the terminal and a base station of the communication system; selecting a plurality of precoding matrixes from a precoding codebook by using the parameter of the downlink channel, wherein a plurality of the precoding matrixes can be used by both of single-user multi-input multi-output (MIMO) transport mode and multi-user MIMO transport mode, and the precoding codebook is an aggregation of precoding matrixes; and feeding back a first information for indicating a plurality of the precoding matrixes to the base station.

17 Claims, 9 Drawing Sheets

(51) Int. Cl.
   H04B 7/04    (2006.01)
   H04W 72/04   (2009.01)
   H04W 76/02   (2009.01)
(52) U.S. Cl.
   CPC ........... H04B 7/0478 (2013.01); H04L 1/0026 (2013.01); H04W 72/042 (2013.01); H04W 76/025 (2013.01)

(56) References Cited

U.S. PATENT DOCUMENTS

| | | | |
|---|---|---|---|
| 2010/0103832 A1 | 4/2010 | Zhou et al. | |
| 2010/0104032 A1* | 4/2010 | Clerckx | H04B 7/0417 375/260 |
| 2010/0150214 A1 | 6/2010 | Seo et al. | |
| 2011/0032839 A1* | 2/2011 | Chen | H04B 7/024 370/252 |
| 2011/0103493 A1* | 5/2011 | Xia | H04B 7/0632 375/259 |
| 2011/0142147 A1 | 6/2011 | Chen et al. | |
| 2011/0176439 A1* | 7/2011 | Mondal | H04L 25/0391 370/252 |
| 2011/0194504 A1 | 8/2011 | Gorokhov et al. | |
| 2011/0235682 A1* | 9/2011 | He | H04J 13/22 375/132 |
| 2012/0020433 A1* | 1/2012 | Bhattad | H04B 7/0639 375/296 |
| 2012/0147992 A1* | 6/2012 | Yang | H04B 7/0413 375/296 |
| 2013/0003812 A1* | 1/2013 | Collotta | H04B 7/0417 375/227 |

OTHER PUBLICATIONS

International Search Report Issued May 5, 2011 in PCT/CN11/70821 Filed Jan. 30, 2011.

* cited by examiner

SU-MIMO

MU-MIMO

CODEBOOK BASED CHANNEL INFORMATION FEEDBACK METHOD, DEVICE AND SYSTEM

CROSS REFERENCE TO RELATED APPLICATION

This application is a Divisional of U.S. Ser. No. 13/522,374, filed Jul. 16, 2012, the entire contents of which is incorporated herein by reference, which is a National Stage of International Application No. PCT/CN2011/070821, filed on Jan. 30, 2011, which is based upon and claims the benefit of priority from Chinese Patent Application No. 201010111774.3, filed on Feb. 11, 2010.

FIELD

The disclosure relates to channel information feedback in multiple input multiple output (MIMO) radio communication system, and particularly, to codebook based channel information feedback methods, apparatus and systems.

BACKGROUND

Multiple antenna transmission may be classified into two types, i.e. single-user multiple input multiple output (SU-MIMO) transmission mode and multiple-user multiple input multiple output (MU-MIMO) transmission mode. FIG. 1(A) illustrates the SU-MIMO transmission mode, and FIG. 1(B) illustrates the MU-MIMO transmission mode. As shown in FIG. 1(A), in SU-MIMO transmission mode, the base station (BS) transmits multiple data flows on the same time frequency resource to the same user. SU-MIMO transmission mode can reduce the error rate of the system by using the diversity gain of multiple antennas and can improve the capacity of the system by using the multiplex gain of multiple antennas. As shown in FIG. 1(B), in MU-MIMO transmission mode, the base station transmits multiple data flows on the same time frequency resource to multiple users, which may be considered as a space division multiple access (SDMA) technique where data is transmitted for multiple users, thereby improving the capacity of the system.

Pre-coding technique is a signal processing technique which pre-processes the symbols to be transmitted by using channel state information at the transmitting end so as to cancel interference and improve the capacity of the system. The pre-coding technique may be classified as two types, i.e. codebook-based pre-coding method and none-codebook-based pre-coding method. To utilize the pre-coding technique, the transmitting end needs to obtain the information about the transmission channel and to determine a pre-coding matrix based on the information about the transmission channel. In multiple input multiple output system, when the base station uses the pre-coding technique for downlink transmission, it requires the user equipment (UE) to feed back downlink channel information. Channel information feedback may be performed by using explicit channel information feedback mode, implicit channel information feedback mode or a feedback mode using the symmetric features of TDD channel. In explicit channel information feedback, the downlink channel information is fed back directly, and in implicit, the channel information is returned implicitly by feeding back a pre-coding matrix or the like.

LTE (Long Term Evolution) proposes an implicit channel information feedback mode. In LTE, the user equipment selects a pre-coding matrix based on the transmission mode and the measured parameters of downlink channel, and feeds back a pre-coding matrix indicator (PMI) corresponding to the pre-coding matrix to the base station. For example, if the SU-MIMO mode is used, the user equipment returns to the base station a PMI of the pre-coding matrix suitable for the SU-MIMO mode, and if the MU-MIMO mode is used, the user equipment returns to the base station a PMI of the pre-coding matrix suitable for the MU-MIMO mode.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the disclosure, there is provided a codebook based user channel information feedback method, the method includes: measuring, by a terminal in the communication system, parameters of a downlink channel between the terminal and a base station of the communication system; selecting a plurality of pre-coding matrixes suitable for both single-user multiple input multiple output (SU-MIMO) transmission and multi-user multiple input multiple output (MU-MIMO) transmission from a pre-coding codebook, the pre-coding codebook being a set of pre-coding matrixes; and feeding back first information indicating the plurality of pre-coding matrixes to the base station.

According to another aspect of the disclosure, there is provided a method for receiving channel information based on a codebook in a communication system, including: receiving, by a base station in the communication system, first information fed back from a terminal in the communication system, the first information indicating a plurality of pre-coding matrixes suitable for both single-user multiple input multiple output (SU-MIMO) transmission and multi-user multiple input multiple output (MU-MIMO) transmission, the plurality of pre-coding matrixes being comprised in a pre-coding codebook which is a set of pre-coding matrixes; selecting the plurality of pre-coding matrixes indicated by the first information from the pre-coding codebook; and generating a third pre-coding matrix corresponding to the terminal based on the plurality of pre-coding matrixes indicated by the first information.

According to another aspect of the disclosure, there is provided a codebook based user channel information feedback apparatus, the apparatus is configured in a terminal in a communication system and includes: a measuring device, configured to measure parameters of a downlink channel between the terminal and a base station of the communication system; an information generating device, configured to select a plurality of pre-coding matrixes suitable for both single-user multiple input multiple output (SU-MIMO) transmission and multi-user multiple input multiple output (MU-MIMO) transmission from a pre-coding codebook, and generate first information indicating the plurality of pre-coding matrixes, wherein the pre-coding codebook is a set of pre-coding matrixes; and a feedback device, configured to feed back the first information to the base station.

According to another aspect of the disclosure, there is provided a codebook based channel information receiving apparatus, the apparatus is configured in a base station in a communication system and includes: a receiving device, configured to receive first information fed back from a terminal in the communication system, wherein the first information indicates a plurality of pre-coding matrixes suitable for both single-user multiple input multiple output (SU-MIMO) transmission and multi-user multiple input multiple output (MU-MIMO) transmission, and the plurality of pre-coding matrixes are comprised in a pre-coding codebook which is a set of pre-coding matrixes; and a matrix generating device, configured to select the plurality of pre-coding matrixes indicated by the first information from the pre-coding codebook, and generate a third pre-coding matrix corresponding to the terminal based on the plurality of pre-coding matrixes indicated by the first information.

According to another aspect of the disclosure, there is provided a method for transmitting channel information based on a codebook in a communication system, including: measuring, by a terminal in the communication system, parameters of a downlink channel between the terminal and a base station of the communication system; selecting a plurality of pre-coding matrixes suitable for both single-user multiple input multiple output (SU-MIMO) transmission and multi-user multiple input multiple output (MU-MIMO) transmission from a pre-coding codebook, the pre-coding codebook being a set of pre-coding matrixes; feeding back first information indicating the plurality of pre-coding matrixes to the base station; receiving, by the base station, the first information;
obtaining the plurality of pre-coding matrixes indicated by the first information from the pre-coding codebook; and generating a third pre-coding matrix to be used to encode data before the data is transmitted between the terminal and the base station based on the plurality of pre-coding matrixes indicated by the first information.

According to another aspect of the disclosure, there is provided a communication system which includes a base station and a terminal. The terminal includes: a measuring device, configured to measure parameters of a downlink channel between the terminal and a base station of the communication system; an information generating device, configured to select a plurality of pre-coding matrixes suitable for both single-user multiple input multiple output (SU-MIMO) transmission and multi-user multiple input multiple output (MU-MIMO) transmission from a pre-coding codebook, and generate first information indicating the plurality of pre-coding matrixes, wherein the pre-coding codebook is a set of pre-coding matrixes; and a feedback device, configured to feed back the first information to the base station. The base station includes a receiving device, configured to receive the first information fed back from the terminal; and a matrix generating device, configured to obtain the plurality of pre-coding matrixes indicated by the first information from the pre-coding codebook, and generate a third pre-coding matrix corresponding to the terminal based on the plurality of pre-coding matrixes indicated by the first information.

In addition, an embodiment of the invention provides computer program for realizing the above methods.

Furthermore, an embodiment of the invention provides a computer program product in the form of computer readable medium on which there are recorded computer program codes for the above methods.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

In the channel information feedback mechanism of LTE system, as described above, when using SU-MIMO transmission mode, the user equipment (UE) returns to the base station a PMI of a pre-coding matrix suitable for SU-MIMO; and when using MU-MIMO transmission mode, the user equipment returns to the base station a PMI of a pre-coding matrix suitable for MU-MIMO. In other words, in this feedback mechanism the user equipment feeds back one PMI at a time and this PMI is optimized for one of SU-MIMO and MU-MIMO. Thus, if the communication system (e.g. LTE-A system) needs to switch between SU-MIMO and MU-MIMO during operation, the user equipment needs to feed back PMI once more.

Figure 1A:
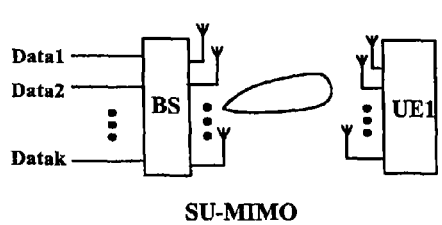
FIG. 1(A) is a schematic diagram illustrating SU-MIMO transmission mode.
Figure 1B:
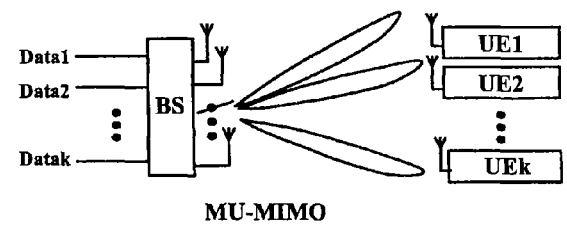
FIG. 1(B) is a schematic diagram illustrating MU-MIMO transmission mode.
Figure 2:
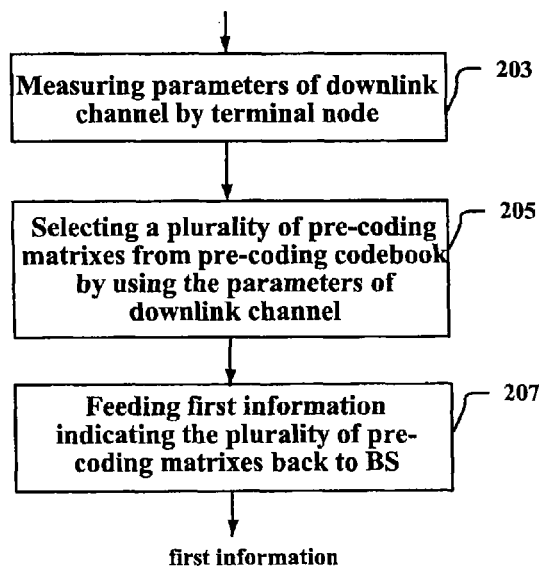
FIG. 2 is a schematic flow chart illustrating a method of feeding back channel information form a terminal node of a communication system to a base station according to an embodiment of the disclosure.

FIG. 2 illustrates a codebook based user channel information feedback method according to an embodiment. In the embodiment, a terminal node (such as UE, also referred to as terminal) of the communication system selects, based on the measure information of downlink channel, from a pre-coding codebook a plurality of pre-coding matrixes optimized for both SU-MIMO and MU-MIMO, and returns to the base station information of the plurality of pre-coding matrixes all together. In this way, even if the system switches between SU-MIMO and MU-MIMO, the terminal node needs not to retransmit the channel information.

As shown in FIG. 2, the codebook based user channel information feedback method includes steps 203, 205 and 207.

In step 203, the terminal measures the parameters of a downlink channel between the terminal and the base station.

The channel parameters to be measured may include channel bandwidth, power of received signal, power of noise, the ratio of signal to noise, and channel matrix, and the like. The channel parameters to be measured may be selected according to practical requirements, the description of which is not detailed here. The terminal may measure the parameters of the downlink channel by using any appropriate method, the description of which is not detailed here, either.

As an example, the base station may send a notification signaling to the terminal via, for example, a downlink control channel, to notify the terminal to measure and return the parameters of the downlink channel. When receiving the notification signaling, the terminal starts to measure the parameters of the downlink channel. As another example, the terminal may measure the parameters of the downlink channel at a predetermined timing or periodically.

Then in step 205, the terminal selects, based on the parameters of the downlink channel, a plurality of pre-coding matrixes from a pre-coding codebook. The pre-coding codebook refers to a set of pre-coding matrixes, which may be saved by both the terminal node and the base station.

In the step, the plurality of selected pre-coding matrixes are optimized for both the single-user multiple input multiple output transmission mode and the multiple-user multiple input multiple output transmission mode based on the channel parameters. As an example, one or more of the plurality of pre-coding matrixes may be optimized for SU-MIMO and the other pre-coding matrixes are optimized for MU-MIMO. As another example, all of the plurality of pre-coding matrixes may be optimized both of the two modes. As another example, one or more of the plurality of pre-coding matrixes may be optimized for both of the two modes, while the others may be optimized for one of MU-MIMO and SU-MIMO.

In step 207, the terminal node returns the information indicating the plurality of pre-coding matrixes (also referred to as the first information) to the base station. The terminal node may feed back the information by any appropriate manner, the description of which is not detailed here.

In the above method, the terminal node returns to the base station the information indicating the plurality of pre-coding matrixes which are optimized for both the MU-MIMO and SU-MIMO. Therefore, when switching between SU-MIMO and MU-MIMO, the terminal node needs not to retransmit the channel information.

As an example, the first information may include the numbering (also referred to as matrix indicator) of each of the plurality of pre-coding matrixes in the pre-coding codebook, so as to reduce the data amount to be fed back.

Figure 3:
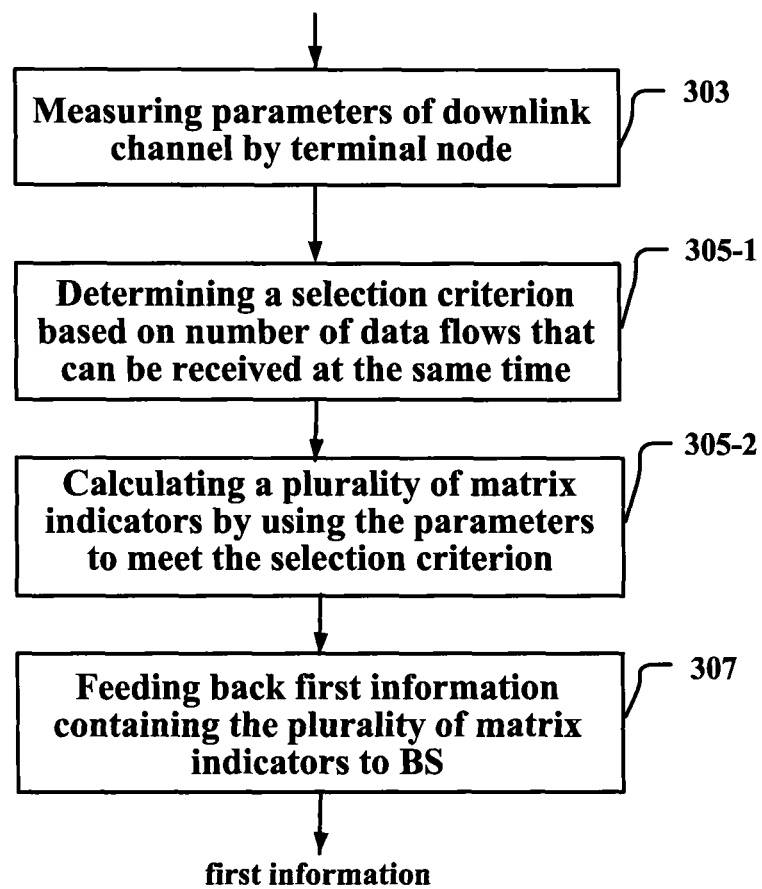
FIG. 3 is a schematic flow chart illustrating a method of feeding back channel information form a terminal node of a communication system to a base station according to another embodiment of the disclosure.

FIG. 3 is a schematic flow chart illustrating the method of feeding back channel information to a base station from a terminal node according to another embodiment. In the embodiment, the terminal node may determine an optimization criterion to be used when selecting the pre-coding matrixes based on the number of data flows that can be received by the terminal at the same time.

Particularly, in step 303 the terminal node measures the parameters of the downlink channel between the base station and this terminal node. Step 303 is similar to step 203, the description of which is not repeated here.

In step 305-1, the terminal node determines the optimization criterion (also referred to as the selection criterion) to be used when selecting the pre-coding matrixes, based on the number of data flows that can be received by it at the same time. Different number of data flows that can be received at the same time corresponds to a different optimization criterion.

In single antenna mode, the terminal node generally can receive only one data flow at a time. While in multiple antenna mode, if using the diversity receiving mode (in the case that the channel condition is poor or the diversity is needed to improve the system performance, the diversity receiving mode may be used and in this case the multiple antennas of the terminal node are used simultaneously to receive one data flow), the terminal can receive only one data flow at a time. On the other hand, if not using the diversity receiving mode in multiple antenna mode, the terminal can receive multiple data flows at the same time.

In step 305-2, the terminal node calculates a plurality of matrix indicators by using the parameters of the downlink channel. Each of the plurality of matrix indicators indicates one of the plurality of pre-coding matrixes. The plurality of matrix indicators meets the selection criterion.

Then in step 307, the terminal node feeds the information (the first information) indicating the plurality of pre-coding matrixes back to the base station.

In the above method, the terminal node determines a selection criterion to be used when selecting the pre-coding matrixes based on the number of data flows that can be received by it at the same time. By using the pre-coding matrixes thus selected to pre-process the signal to be transmitted, the interference can be reduced as much as possible, thereby improving the capacity of the system.

Figure 4:
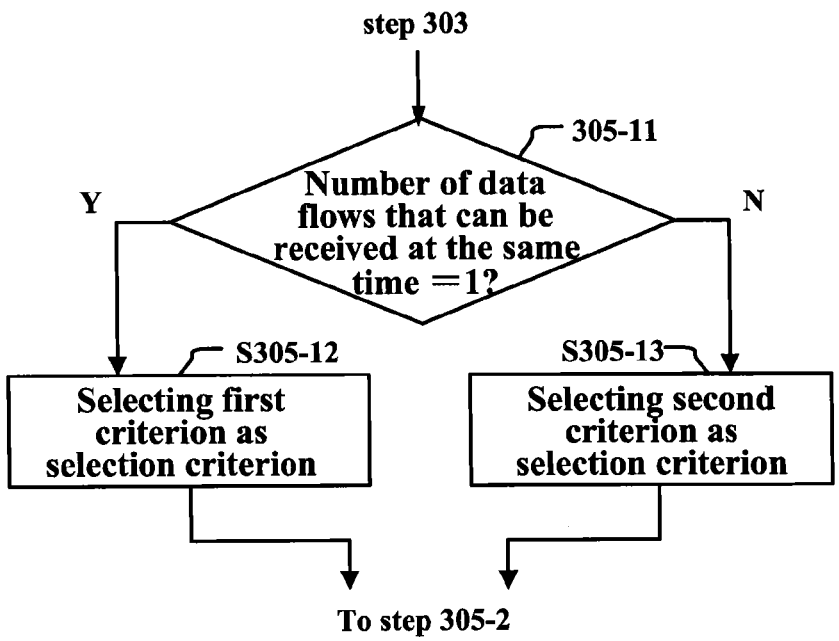
FIG. 4 illustrates an example of the criterion determining process shown in FIG. 3.

FIG. 4 illustrates an example of the process for determining the selection criterion In the example, when the parameters of the downlink channel are measured in step 303, the terminal determines whether the number of data flows that can be received by it at the same time is 1 in step 305-11.

If the number is 1, in step 305-12 the terminal determines the first criterion as the selection criterion. The first criterion includes: making one of the plurality of pre-coding matrixes (referred to as the first pre-coding matrix) to be optimized for both of the single-user multiple input multiple output transmission mode and the multiple-user multiple input multiple output transmission mode, and making another one of the plurality of pre-coding matrixes (referred to as the second pre-coding matrix) to be optimized for enhancing the multiple-user multiple input multiple output transmission mode.

If the number of data flows that can be received by the terminal node at the same time is larger than 1, in step 305-13 determines the second criterion as the selection criterion: i.e. making the first pre-coding matrix to be optimized for high-rank single-user multiple input multiple output transmission mode and making the second pre-coding matrix to be optimized for 1-rank multiple-user multiple input multiple output transmission mode.

The pre-coding codebook used in MU-MIMO transmission mode is 1-rank. Therefore, if the pre-coding matrixes selected by the terminal node all are for high-rank pre-coding codebook, it will be difficult for the base station to deduce the 1-rank pre-coding matrix suitable for MU-MIMO based on the high-rank pre-coding matrixes fed back by the terminal. In the example, if the number of data flows that can be received by the terminal node at the same time is larger than 1, the pre-coding matrixes selected by the terminal may further include a matrix (the second pre-coding matrix) for 1-rank MU-MIMO, in addition to the pre-coding matrix (e.g. the first pre-coding matrix) for high-rank SU-MIMO transmission mode. In this way, the base station can deduce, based on the information feed back from the terminal, the 1-rank pre-coding matrix suitable for MU-MIMO when determining that MU-MIMO transmission mode is to used, and the terminal node needs not to retransmit the information.

In addition, in the example, if the number of data flows that can be received by the terminal node at the same time is larger than 1, the pre-coding matrixes selected by the terminal node include not only the pre-coding matrix (the first pre-coding matrix) for both the MU-MIMO and SU-MIMO, but also includes the pre-coding matrix (the second pre-coding matrix) for enhancing the MU-MIMO. In this way, when determining to use MU-MIMO transmission mode, the pre-coding matrixes determined by the base station based on the information fed back from the terminal will be more suitable for MU-MIMO transmission mode, thus improving the system performance.

Figure 5:
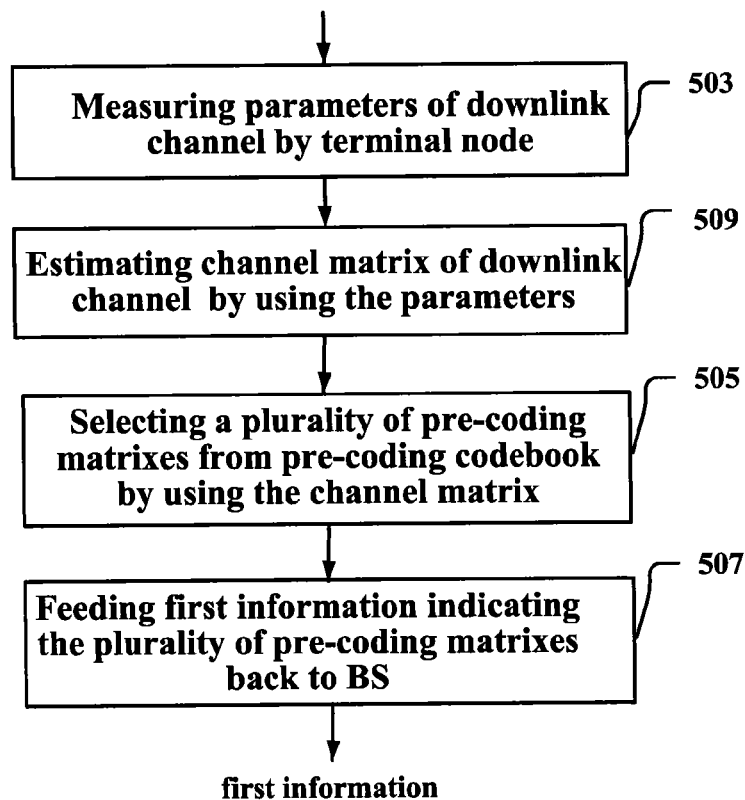
FIGS. 5-7 are schematic flow charts illustrating methods of feeding back channel information form a terminal node of a communication system to a base station according to other embodiments of the disclosure.

FIG. 5 is a schematic diagram illustrating the method of returning channel information from a terminal to a base station according to another embodiment. The embodiment shown in FIG. 5 is similar to that shown in FIG. 2. The difference lies in that, the method of FIG. 5 further includes step 509 of estimating the channel matrix of the downlink channel by using the measured parameters of the channel.

As shown in FIG. 5, in step 503 the terminal measures the parameters of the downlink channel between itself and the base station. The step is similar to step 203, the description of which is not repeated here.

Then in step 509, the terminal estimates the channel matrix of the downlink channel by using the measured parameters of the channel. The terminal may estimate the channel matrix by using any appropriate technique, for example, the terminal may estimate the channel matrix according to the pilot channel transmitted by the base station, the description of which is not detailed herein.

Then in step 505, the terminal calculates a plurality of matrix indicators by using the estimated channel matrix. In step 507, the terminal returns the first information including the plurality of matrix indicators to the base station.

As an example, when calculating each matrix indicator by using the channel matrix, the distance between the pre-coding matrix corresponding to the calculated matrix indicator and the channel matrix may be made to be minimum, while the selection criterion is met. As another example, the distance between the enhancement matrix of the pre-coding matrix corresponding to the calculated matrix indicator and the channel matrix may be made to be minimum, while the selection criterion is met. As another example, the distance between the pre-coding matrix corresponding to the calculated matrix indicator and a equivalent transformation matrix of the channel matrix may be made to be minimum, while the selection criterion is met. As another example, the pre-coding matrix corresponding to the calculated matrix indicator may be made to make the throughput of the communication system to be maximum, while the selection criterion is met.

Figure 6:
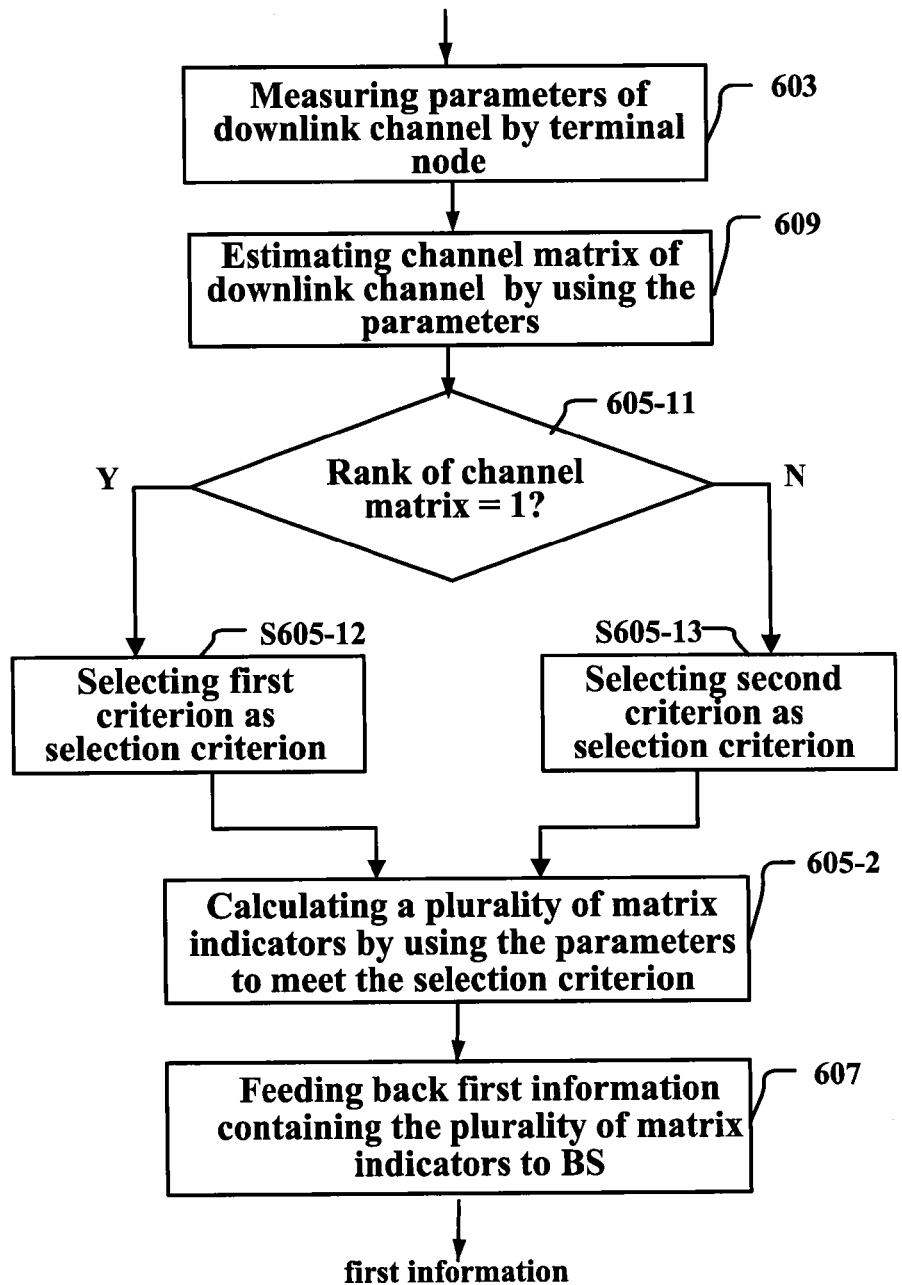

FIG. 6 illustrates a method of feeding back channel information according to another embodiment. In the method of FIG. 6, the selection criterion is determined based on the rank of the estimated channel matrix.

As shown in FIG. 6, in step 603 the terminal measures the parameters of the downlink channel between itself and the base station. The step is similar to step 203, the description of which is not repeated here. Then in step 609, the terminal node estimates the channel matrix of the downlink channel by using the measured parameters. The step is similar to step 509, the description of which is not repeated here.

In step 605-11, the terminal node judges whether the rank of the channel matrix is 1. if the rank is 1, it means the receiving end of the channel (i.e. the terminal node in the embodiment) can receive only one data flow at a time. If the rank is larger than 1, it means the receiving end of the channel (i.e. the terminal node in the embodiment) can receive multiple data flows at the same time. In other words, the rank of the channel matrix equals to the number of data flows that can be received by the receiving end at the same time.

If the rank of the channel matrix is 1, the terminal selects the first criterion in step 605-12; otherwise, the second criterion is selected in step 605-13. Then in step 605-2 the terminal calculates a plurality of matrix indicators by using the channel matrix, the pre-coding matrix corresponding to each matrix indicator meets the first criterion or the second criterion.

As an example, if the rank of the channel matrix is 1, the following formula 1 may be used to calculate the first matrix indicator corresponding to the first pre-coding matrix, and the formula 2 may be used to calculate the second matrix indicator corresponding to the second pre-coding matrix:

$$PMI1 = \arg_{b=1,\ldots B} \max(|Hw_b|/\|H\|/w_b\|) \quad \text{Formula 1}$$

$$PMI2 = \arg_{b=1,\ldots B} \max(|H[w_{PMI1} + f(w_b)]|/\|H\|/\|w_{PMI1} + f(w_b)\|) \quad \text{Formula 2}$$

In the above, PMI1 represents the first matrix indicator, PMI2 represents the second matrix indicator, B represents the number of the pre-coding matrixes in the pre-coding codebook under the current rank (e.g. 1), $1 \leq b \leq B$, H represents the estimated channel matrix, $w_b$ represents the precoding matrix corresponding to b in the pre-coding codebook, ||H|| represents the norm of the channel matrix, $$\arg\max_{b=1,\ldots B}(\ )$$

means that, in multiple values (B values), b which corresponds to the largest value is selected as the matrix indicator PMI1 or PMI2, $f(\cdot)$ represents any function which can be set according to practical requirements, and | | represents calculation of an absolute value.

As an example, $f(w_b)$ may be a linear function of $w_b$, for example, $f(w_b)=\alpha w_b$ and $0\leq\alpha\leq1$. Preferably, $0.5\leq\alpha\leq0.7$. As another example, $f(w_b)$ may be a logarithm function of $w_b$. It should be noted that the examples of $f(w_b)$ are merely illustrative, rather than exhaustive. Any appropriate function may be chosen as $f(w_b)$ according to the practical requirements and is not enumerated here.

The first pre-coding matrix corresponding to the first matrix indicator calculated by formula 1 not only may be used as the pre-coding matrix for SU-MIMO, but also may be used as the pre-coding matrix for MU-MIMO transmission. Formula 1 is based on the principle of minimizing the distance between matrixes, that is, the first pre-coding matrix thus calculated is closest to the channel matrix H in distance.

In formula 2, the second matrix indicator is determined based on the first matrix indicator, the equivalent feedback pre-coding matrix is as follows:

$$w_{PMI1}+f(w_b),$$

which is equivalent to an increase of the number of elements in the pre-coding codebook for MU-MIMO.

The second pre-coding matrix corresponding to the second matrix indicator calculated by formula 2 may be used to enhance the performance of MU-MIMO transmission. When the base station decides to use the MU-MIMO transmission mode, it may use the second pre-coding matrix to generate the pre-coding matrix to be used. In the example, the second matrix indicator is required to fit the first matrix indicator, to improve the performance of MU-MIMO. Formula 2 is also based on the principle of minimizing the distance between matrixes, that is, the enhanced second pre-coding matrix is closest to the channel matrix H in distance.

As an example, if the rank of the channel matrix is larger than 1, the following formula 3 may be used to calculate the first matrix indicator of the first pre-coding matrix, and the following formula 4 may be used to calculate the second matrix indicator of the second pre-coding matrix:

$$PMI1 = \arg\max_{b'=1,\ldots B'}|\mathrm{logdet}(I+SNRHw'_{b'}w'^H_{b'}H^H)| \quad \text{Formula 3}$$

$$PMI2 = \arg\max_{b=1,\ldots,B}|f(H)w_b| \quad \text{Formula 4}$$

In the above formulae, PMI1 represents the first matrix indicator, PMI2 represents the second matrix indicator, B represents the number of the pre-coding matrixes in the pre-coding codebook of rank 1, $1\leq b\leq B$, $w_b$ represents the pre-coding matrix corresponding to b in the pre-coding codebook of rank 1, B' represents the number of the pre-coding matrixes in the pre-coding codebook of the current rank (the rank is larger than 1), $1\leq b'\leq B$, $w'_{b'}$ represents the pre-coding matrix corresponding to b' in the pre-coding codebook of rank larger than 1, H represents the estimated channel matrix, ||H|| represents the norm of the channel matrix H, $$\arg\max_{b=1,\ldots B}(\ )$$

means that, in multiple values (B values), b which corresponds to the largest value is selected as the matrix indicator. $f(H)$ represents any appropriate function that can be set according to practical requirements. For example, $$\left(\sum_{i=1}^{RI} H_i\right)$$

is an example of $f(H)$, in which RI represents the rank of the channel matrix, $H_i$ represents the ith row of the matrix H. It should be noted, the example is merely illustrative. Any appropriate function may be chose as $f(H)$ according to practical requirements and is not enumerated here. SNR represents the receiving signal-to-noise ratio, where $$SNR = \frac{P}{N_T},$$

P represents the signal receiving power of the terminal node on the downlink channel, $N_T$ represents the interference power received by the terminal, I represents a unit matrix, $\det(\cdot)$ represents the determinant of a matrix, and log( ) represents a logarithm function.

The first pre-coding matrix corresponding to the first matrix indicator calculated by formula 3 is an element in the pre-coding codebook of current rank (i.e. the high-rank pre-coding codebook) for optimizing the SU-MIMO transmission.

As an example, the pre-coding matrix may be selected based on the performance index of the communication system, such as the channel capacity, BLER(Block Error Rate), BER(Bit Error Rate) and the like, or may be selected based on quantizing of the channel matrix or other methods for optimizing SU-MIMO. Formula 3 is based on the principle of maximizing the channel capacity and thus the pre-coding matrix calculated by formula 3 may maximize the total throughput.

Quantizing of the channel matrix means to approximately representing the channel matrix by using a limited number of bits, and may be classified as two types, i.e. quantizing of matrix elements and quantizing based on codebook. Quantizing of matrix elements means to represent each element in a matrix by using a limited number of bits, where the bit number of each element represents the preciseness of the quantizing. Quantizing based on codebook means to select elements that are closest to the channel matrix in distance from candidate codebook and use the sequence number of the selected elements to represent the quantized channel matrix.

The distance between matrixes may be calculated by using various methods. It is supposed that w represents a candidate pre-coding matrix in the pre-coding codebook, b represents the sequence number of the candidate pre-coding matrix, H represents the channel matrix to be quantized, then the following formula 5, formula 6 or formula 7 may be used to obtain the pre-coding matrix that is closest to the channel matrix H in distance.

$$b = \underset{b=1,\ldots,B}{\arg\ \max} \det(Hw_b) \qquad \text{Formula 5}$$

$$b = \underset{b=1,\ldots,B}{\arg\ \max} \operatorname{trace}(Hw_b) \qquad \text{Formula 6}$$

$$b = \underset{b=1,\ldots,B}{\arg\ \max} \|Hw_b\| \qquad \text{Formula 7}$$

$$\underset{b=1,\ldots,B}{\arg\ \max}(\bullet)$$

means to select the largest value among a designated number (b=1, . . . , B) of expressions, det(•) represents the determinant of a matrix, trace(•) represents the trace of a matrix, and ||.|| represents any norm. The norm to be used may be defined as required. Generally the norm may be 2. Formula 5 is based on the principle of minimizing the determinant, formula 6 is based on the principle of minimizing the trace, and formula 7 is based on the principle of minimizing the norm.

The second pre-coding matrix corresponding to the second matrix indicator calculated by formula 4 is an element in the 1-rank pre-coding codebook (i.e. the pre-coding codebook corresponding to rank 1) for optimizing the MU-MIMO and user mate selection. Formula 4 is also based on the principle of minimizing the distance between matrixes, i.e. to minimize the distance between the second pre-coding matrix and the equivalent matrix of the channel matrix.

As an example, the terminal node may select 2 pre-coding matrixes, and returns the information indicating the 2 pre-coding matrixes (e.g. 2 matrix indicators) to the base station.

As an example, the terminal node may return the number of data flows that can be received by it at the same time (e.g. the rank of the matrix of the downlink channel) to the base station.

Figure 7:
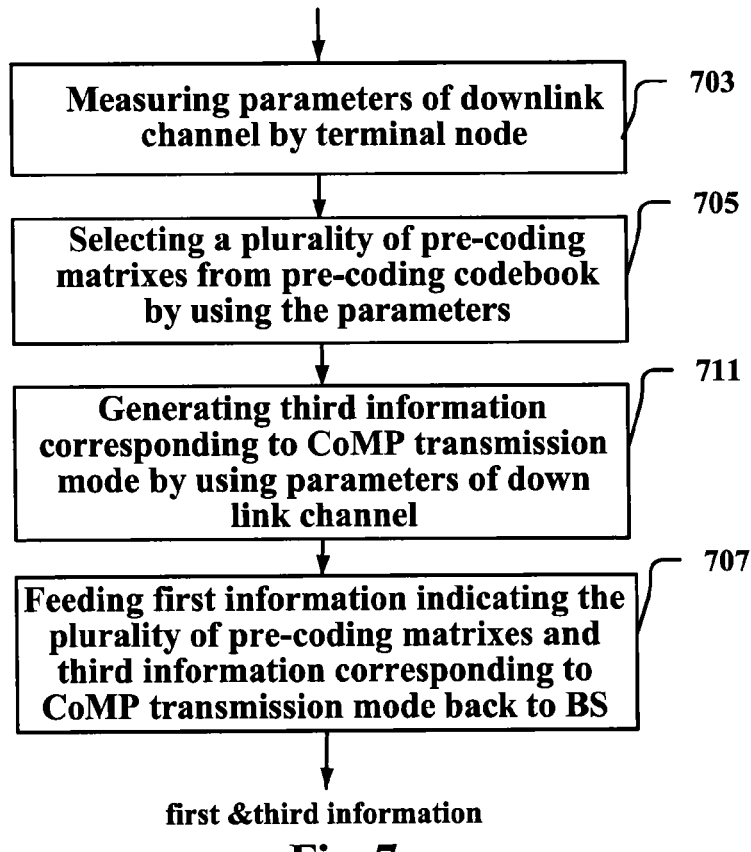

FIG. 7 illustrates a method of feeding back channel information according to another embodiment. As shown in FIG. 7, the method includes steps 703, 705, 711 and 707. Different from the embodiments shown in FIGS. 2-6, in the method of FIG. 7 the terminal may return feedback information corresponding to coordinated multi-points (CoMP) transmission mode to the base station.

Steps 703 and 705 are similar to step 203/303/503/603 and step 205/305/505/605, the description of which is not repeated here.

In step 711, the terminal may generate the feedback information corresponding to CoMP transmission mode by using the parameters of the downlink channel. In step 707, the terminal may send the feedback information corresponding to CoMP transmission mode and the first information to the base station.

In the embodiment, in addition to SU-MIMO and MU-MIMO, other close-ring transmission mode, such as CoMP, is also used. The base station and the terminal node may negotiate the supportable transmission mode via parameter configuration and interactive negotiation. When the base station and the terminal node support other close-ring transmission mode, such as CoMP, in addition to SU-MIMO and MU-MIMO, the terminal node may return feedback information corresponding to the other close-ring transmission mode by explicit or implicit channel information. The amount and contents of the feedback information may be set according to practical transmission mode and channel condition. As an example, if CoMP is supported, the terminal may select one or more pre-coding matrixes suitable for CoMP based on the matrix of the downlink channel and returns the information of the selected pre-coding matrixes to the base station.

Figure 8:
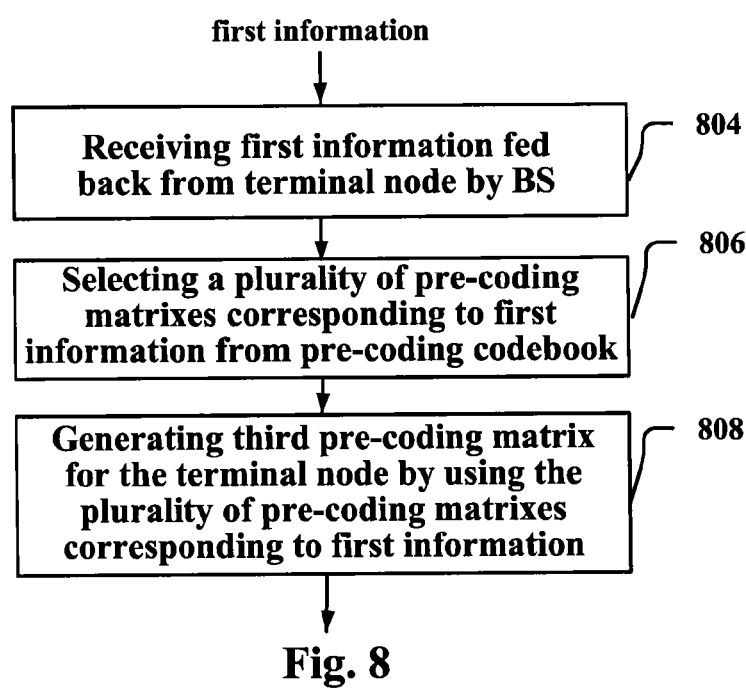
FIG. 8 is a schematic flow chart illustrating a method of receiving channel information returned from a terminal node by a base station of the communication system according to an embodiment of the disclosure.

FIG. 8 illustrates a method of receiving by the base station channel information fed back from the terminal node according to an embodiment. As shown in FIG. 8, the method includes steps 804, 806 and 808.

In step 804, the base station receives the information (the first information) indicating a plurality of pre-coding matrixes for both single-user multiple input multiple output transmission mode and multiple-user multiple input multiple output transmission mode returned from the terminal node in the communication system. In step 806, the base station selects in the pre-coding codebook a plurality of pre-coding matrixes corresponding to the first information. In step 808, the base station generates the pre-coding matrix (referred to as the third pre-coding matrix) corresponding to the terminal node by using the plurality of pre-coding matrixes corresponding to the first information.

In an example, the first information received by the base station may include a plurality of matrix indicators, each of which corresponds to one of the plurality of pre-coding matrixes. In this way, the base station may select, from the pre-coding codebook, the pre-coding matrixes corresponding to the matrix indicators. In another example, the base station may receive the information indicating the number of data flows that can be received by the terminal node at the same time (e.g. the rank of the channel matrix of the downlink channel) returned from the terminal node.

As an example, the base station may select one from the plurality of pre-coding matrixes according to the transmission mode to be used, as the pre-coding matrix for the terminal node. As another example, the base station may generate the third pre-coding matrix by using any other appropriate method. For example, the base station may use the equivalent transformation matrix of a pre-coding matrix among the plurality of pre-coding matrixes, as the third pre-coding matrix. If the rank of the matrix of the downlink channel is 1, the terminal uses the first criterion to generate 2 matrix indicators PMI1 and PMI2, where the latter is calculated by formula 2. After receiving the information, if the base station decides to use MU-MIMO transmission mode, it may use the equivalent feedback matrix of PMI2, as the third pre-coding matrix, that is, the third pre-coding matrix $w_1$ may be obtained by the following formula:

$$w_1 = w_{PMI1} + f(w_{PMI2}) \qquad \text{Formula 8(a)}$$

$w_{PMI1}$ represents the pre-coding matrix corresponding to the matrix indicator PMI1, $w_{PMI2}$ represents the pre-coding matrix corresponding to the matrix indicator PMI2. If formula 2 uses $f(w_b)=\alpha w_b$, formula 8(a) may be the following:

$$w_1 = w_{PMI1} + \alpha w_{PMI2} \qquad \text{Formula 8(b)}$$

$0 \leq \alpha \leq 1$. Preferably, $0.5 \leq \alpha \leq 0.7$.

As an example, the base station judge which criterion (and which formula) is used by the terminal node in selecting the pre-coding matrixes based on the number of data flows that can be received by the terminal node at the same time (e.g. the rank of the channel matrix of the downlink channel), and configure the third pre-coding matrix based on the determined criterion.

Figure 9:
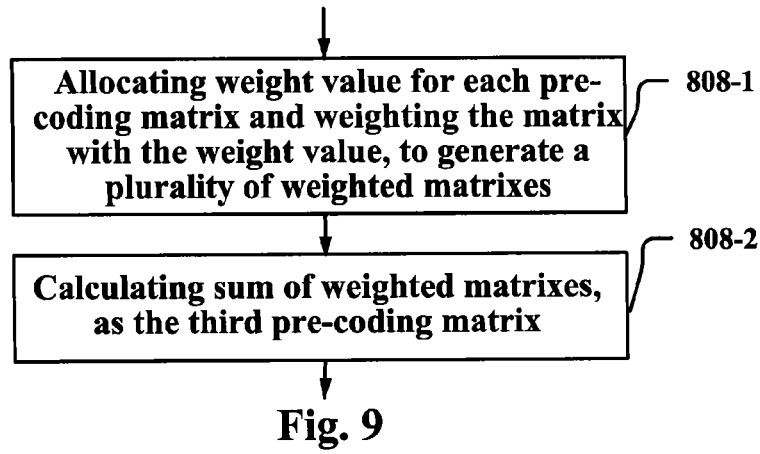
FIG. 9 illustrates an example of step 808 shown in FIG. 8.

FIG. 9 illustrates an example of the process of generating the third pre-coding matrix by the base station using the first information. As shown in FIG. 9, step 808 of generating the third pre-coding matrix may include steps 808-1 and 808-2.

In step 808-1, a weight value is allocated to each of the plurality of pre-coding matrixes and each of the plurality of pre-coding matrixes is weighted by using the weight value, to generate a plurality of weighted matrixes. Each weight value is larger than or equals to 0 and is less than or equals to 1. Then in step 808-2, the sum of the plurality of weighted matrixes is calculated, as the third pre-coding matrix.

As an example, it is supposed that the terminal node feeds back 2 matrix indicators PMI1 and PMI2, the corresponding pre-coding matrixes are respectively represented as $w_{PMI1}$ and $w_{PMI2}$, then the generated third pre-coding matrix $w_1$ may be represented by:

$$w1 = \beta w_{PMI1} + \alpha w_{PMI2} \quad \text{Formula 8c}$$

where, $0 \leq \beta \leq 1$, $0 \leq \alpha \leq 1$. The values of $\beta$ and $\alpha$ may be selected according to practical requirements.

Some examples of generating by the base station a pre-coding matrix for a terminal node by using the feedback information from the terminal node. It should be noted, these examples are merely illustrative, rather than exhaustive. Any other appropriate method can be used, which is not enumerated herein.

Figure 10:
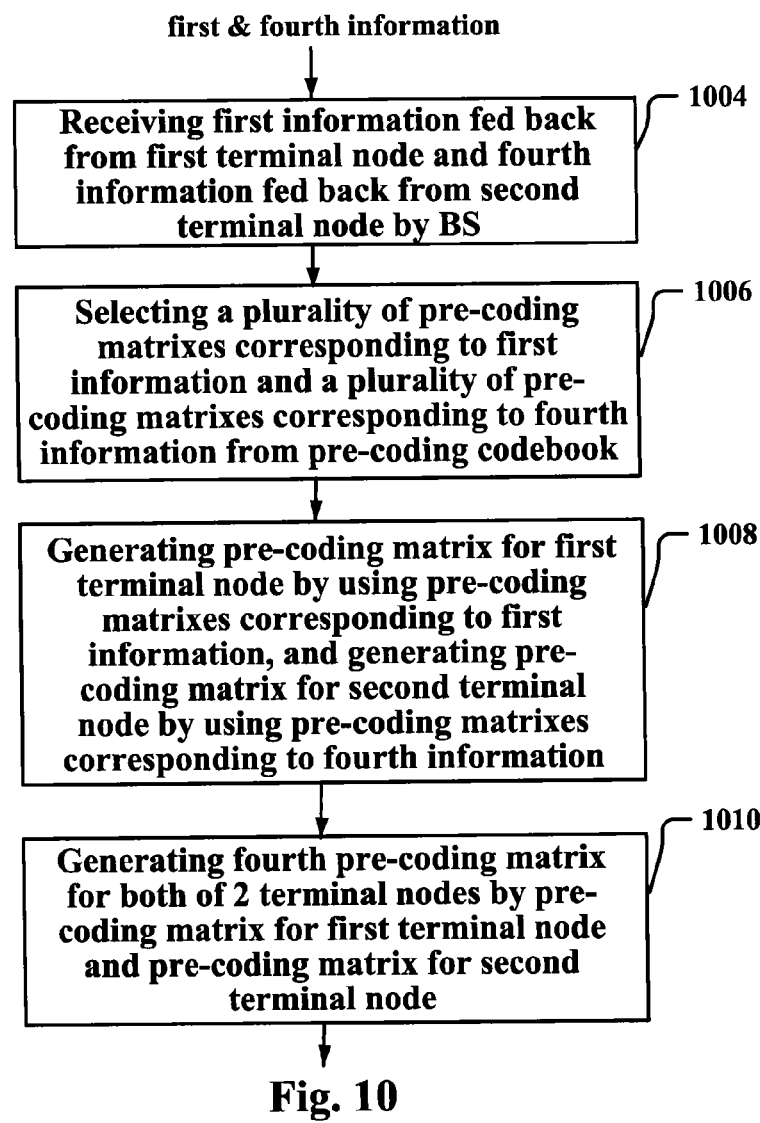
FIG. 10 is a schematic flow chart illustrating a method of receiving channel information returned from a terminal node by a base station of the communication system according to another embodiment of the disclosure.

FIG. 10 illustrates a method of receiving by a base station channel information fed back from terminal nodes according to an embodiment. The embodiment illustrates the method of receiving by the base station feedback information from multiple terminal nodes. In the embodiment, it is supposed that the base station receives and processes feedback information from 2 terminal nodes. The 2 terminal nodes include the first terminal node and the second terminal node. As shown in FIG. 10, the method includes steps 1004, 1006, 1008 and 1010.

In step 1004, the base station receives the information (the first information) indicating a plurality of pre-coding matrixes for both the single-user multiple input multiple output transmission mode and the multiple-user multiple input multiple output transmission mode returned from the first terminal node in the communication system and the information indicating a plurality of pre-coding matrixes (the fourth information) for both the single-user multiple input multiple output transmission mode and the multiple-user multiple input multiple output transmission mode returned from the second terminal node.

In step 1006, the base station selects a plurality of pre-coding matrixes corresponding to the first information from the pre-coding codebook and selects a plurality of pre-coding matrixes corresponding to the fourth information from the pre-coding codebook.

In step 1008, the base station generates a pre-coding matrix corresponding to the first terminal node by using the plurality of pre-coding matrixes corresponding to the first information; and generates a pre-coding matrix corresponding to the second terminal node by using the plurality of pre-coding matrixes corresponding to the fourth information. The base station may use the above described method to generate the matrix, the description of which is not repeated.

In step 1010, if the base station decides to use the multiple-user multiple input multiple output transmission mode and mate the first terminal node with the second terminal node, it generates a pre-coding matrix (the fourth pre-coding matrix) to be used in communication with the two terminal nodes based on the pre-coding matrix corresponding to the first terminal node and the pre-coding matrix corresponding to the second terminal node.

As an example, it is supposed that the pre-coding matrix corresponding to the first terminal node is represented as $w_1$ and the pre-coding matrix corresponding to the second terminal node is represented as $w_2$, then the following formula may be used to generate the fourth pre-coding matrix G:

$$G = [w_1, w_2]([w_1, w_2]^H [w_1, w_2])^{-1} \quad \text{Formula 9a}$$

As another example, it is supposed that the base station receives feedback information from multiple terminal nodes (k terminal nodes) and determines the pre-coding matrixes $w_1, w_2, \ldots, w_k$, each of which corresponds to one of the k terminal nodes. If the base station decides to use the MU-MIMO transmission mode and mate the k terminal nodes, then the following formula may be used to generate a pre-coding matrix G to be used in communication with these terminal nodes:

$$G = [w_1, w_2, \ldots, w_k]([w_1, w_2, \ldots, w_k]^H [w_1, w_2, \ldots, w_k])^{-1} \quad \text{Formula 9b}$$

Formula 9b is an extension to formula 9a. It should be noted, formula 9b or 9a are merely examples of generating the fourth pre-coding matrix. Any other appropriate method may be used to generate the fourth pre-coding matrix, which is not enumerated herein.

Some examples in which the method of the disclosure is applied are described below with reference to FIG. 11 to FIG. 13.

EXAMPLE 1

Figure 11:
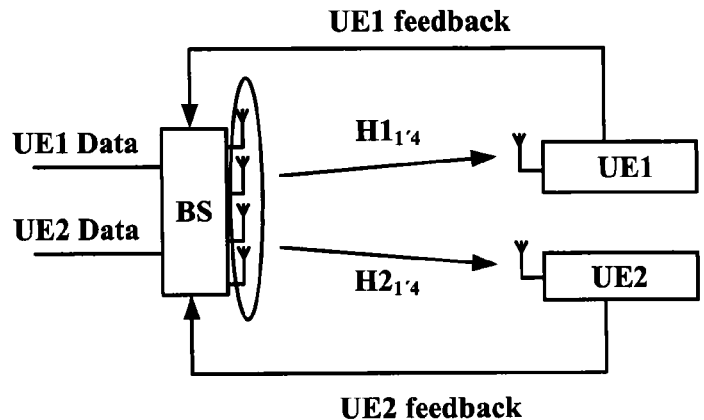
FIG. 11 is a schematic diagram illustrating an example of application scenario to which the method according to an embodiment of the disclosure can be applied.

FIG. 11 illustrates example 1 in which the method of the disclosure is applied, where the feedback process under 1-rank MU-MIMO is illustrated. It is supposed that the base station (BS) has 4 transmission antennas; the terminal nodes UE1 and UE2 each have 1 receiving antenna. The channel matrixes of the downlink channels between BS and UE1, UE2 are respectively represented as $H1_{1 \times 4}$ and $H2_{1 \times 4}$.

Firstly, BS notifies UE1 and UE2 of the measure parameters via the downlink control channels. The measure parameters may include measure bandwidth, feedback cycle (i.e. the cycle in which the terminal node feeds back the channel information), and the like.

UE1 may estimate the channel matrix $H1_{1 \times 4}$ by using the pilot channel transmitted from BS. UE2 may estimate the channel matrix $H2_{1 \times 4}$ by using the pilot channel transmitted from BS.

UE1 judges that the rank RI of the downlink channel matrix $H1_{1 \times 4}$ is 1 and determines to use the first criterion, and decides to generated 2 matrix indicators.

Firstly, UE1 calculates the first matrix indicator using $H1_{1 \times 4}$ by formula 1. In the example $w_b$ is a 4×1 pre-coding matrix. It is supposed that the first matrix indicator PMI1 is 7, then the $7^{th}$ pre-coding matrix in the 4×1 pre-coding codebook is to be fed back.

Then UE1 calculates the second matrix indicator using $H1_{1 \times 4}$ by formula 2. $w_b$ is a 4×1 pre-coding matrix, and $w_{PMI1}$ is the pre-coding matrix corresponding to the first matrix indicator. $f(w_b)$ may be any function which can be set as required. For example, $(w_{PMI1} + \alpha w_b)$ may be used as an example of $f(w_b)$. The value of $\alpha$ is between 0-1, $0.5 \leq \alpha \leq 0.7$. The change of the value of $\alpha$ may incur the change of the codebook vector amplitude. The smaller the value of $\alpha$ is, the smaller the change of the codebook vector amplitude is and the smaller the difference between the new codebook and the old codebook is; the larger the value of $\alpha$ is, the larger the change of the codebook vector amplitude is and the larger the difference between the new codebook and the old codebook is. It is supposed that the second matrix indicator PMI2 is 3, then the $3^{rd}$ pre-coding matrix in the 4×1 pre-coding codebook is to be fed back.

The feedback information of UE1 may include: PMI1=7, PMI2=3 and RI=1. UE1 feeds back the information to BS via an uplink feedback channel.

UE2 determines that the rank RI of the downlink channel matrix $H2_{1\times4}$ is 1 and determines the first criterion is the selection criterion, and decides to feed back 2 matrix indicators.

UE2 calculates the first matrix indicator PMI1 by formula 1 using $H2_{1\times4}$. $w_b$ is a 4×1 pre-coding matrix. For example, PMI1 is 5, which means that the 5th pre-coding matrix in the set of 4×1 pre-coding matrixes is to be fed back.

UE2 calculates the second matrix indicator PMI2 by formula 2 using $H2_{1\times4}$. $w_b$ is a 4×1 pre-coding matrix, and $w_{PMI1}$ is the pre-coding matrix corresponding to the first matrix indicator. ($w_{PMI1}+\alpha w_b$) is an example of $f(w_b)$. $\alpha$ is a predetermined value. It is supposed that PMI2 is 1, then the first matrix in the set of 4×1 pre-coding matrixes is to be fed back.

The feedback information of UE2 may include: PMI1=5, PMI2=1 and RI=1. UE2 feeds back the information to BS via an uplink feedback channel.

BS receives the feedback information from UE1 and UE2, decides to use MU-MIMO transmission mode after scheduling, and mates UE1 and UE2. BS generates a matrix $w1=w_7+\alpha w_3$ for UE1 and a matrix $w2=w_5+\alpha w_1$ for UE2, and then calculates the 4×2 MU-MIMO pre-coding matrixes to be sued by formula 9a.

EXAMPLE 2

Figure 12:
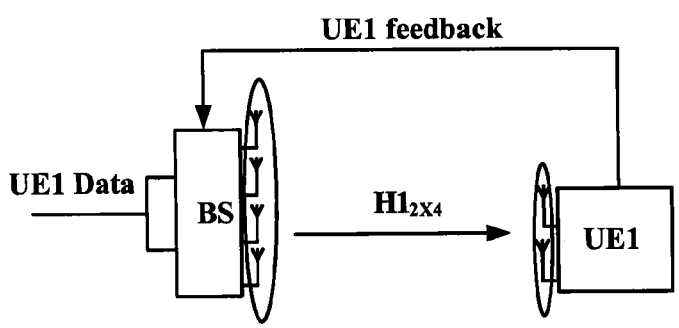
FIG. 12 is a schematic diagram illustrating another example of application scenario to which the method according to an embodiment of the disclosure can be applied.

FIG. 12 illustrates a codebook based pre-coding and feedback process under high-rank SU-MIMO. It is supposed that BS has 4 transmission antennas, UE1 has 2 receiving antennas, and the channel matrix of the downlink channel between BS and UE1 is $H_{2\times4}$.

BS notifies UE1 of the measure parameters via the downlink control channel. The measure parameters may include measure bandwidth, feedback cycle, and the like.

UE1 estimates the channel matrix $H_{2\times4}$ via the pilot channel transmitted by BS. UE1 measures the receiving power (RSRP) of the pilot signal, estimates the interference level in the current measure bandwidth, and calculates the signal-to-noise ratio SNR by using the two parameters.

UE1 judges that the rank RI of the downlink channel matrix is 2 and determines to use the second criterion and decides to feed back 2 matrix indicators.

UE1 calculates the first matrix indicator PMI1 by formula 3, using $H_{2\times4}$. SNR is the receiving SNR calculated by UE1. $w_b$ is a 4×2 pre-coding matrix. For example, supposing PMI1 is 13, then the $13^{th}$ element in the set of 4×2 pre-coding matrixes is to be fed back.

UE1 calculates the second matrix indicator PMI2 by using $H_{2\times4}$ by the following formula:

$$b = \arg\max_{b=1,\ldots,B} \left|\left(\sum_{i=1}^{RI} H_i\right) W_b\right| \quad \text{Formula 10}$$

$H_i$ represents the ith row in the channel matrix H, and $w_b$ is a 4×1 pre-coding matrix.

$$\left(\sum_{i=1}^{RI} H_i\right)$$

is an example of $f(H)$. It is supposed that b=8 as PMI2, then the $8^{th}$ element in the set of 4×1 pre-coding matrixes is to be fed back.

The information to be fed back by UE1 includes: PMI1=13, PMI2=8 and RI=2. UE2 feeds back the information to BS via an uplink feedback channel.

After receiving the information, BS decides by scheduling to use the SU-MIMO transmission mode, and uses the matrix indicated by the first matrix indicator PMI1. That is, $w_{13}$ in the 4×2 pre-coding codebook is used a the pre-coding matrix to be used.

EXAMPLE 3

Figure 13:
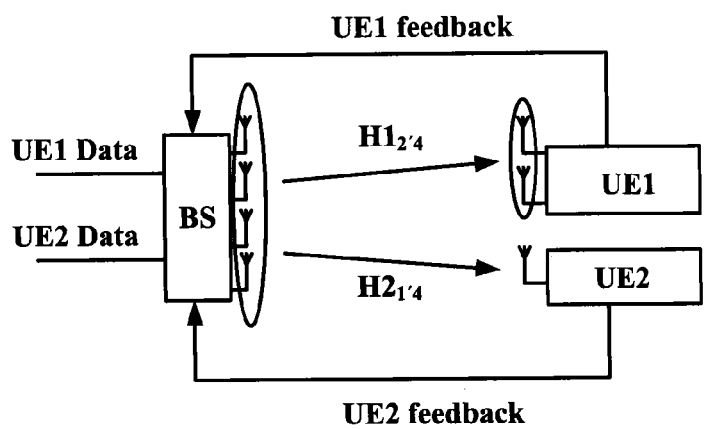
FIG. 13 is a schematic diagram illustrating another example of application scenario to which the method according to an embodiment of the disclosure can be applied.

FIG. 13 illustrates a feedback process of hybrid 1-rank and high-rank MU-MIMO. BS has 4 transmission antennas, UE1 has 2 receiving antennas, and UE2 has 1 receiving antenna. The matrixes of the downlink channels between BS and UE1, UE2 are respectively represented as $H1_{2\times4}$ and $H2_{1\times4}$.

BS notified UE1 and UE2 of measure parameters via the downlink control channel. The measure parameters include measure bandwidth, feedback cycle, and the like.

UE1 estimates the channel matrix $H1_{2\times4}$ via the pilot channel transmitted from BS. UE2 estimates the channel matrix $H2_{1\times4}$ via the pilot channel transmitted from BS. UE1 measures the receiving power (RSRP) of the pilot signal, estimates the interference level in the current measure bandwidth, and calculates the signal-to-noise ratio SNR by using the two parameters.

UE1 judges that the rank RI of the channel matrix is 2, determines to use the second criterion, and generates 2 matrix indicators.

UE1 calculates the first matrix indicator PMI1 by formula 3 using $H1_{2\times4}$. SNR represents the receiving SNR calculated by UE1. $w_b$ is a 4×2 pre-coding matrix. It is supposed that PMI1 is 13, then the $13^{th}$ elements in the set of 4×2 pre-coding matrixes is to be fed back.

UE1 calculates the second matrix indicator PMI2 by formula 10 using $H1_{2\times4}$. $H_i$ is the ith row in the channel matrix H1. $w_b$ is a 4×1 pre-coding matrix. It is supposed that PMI2 is 8, then the $8^{th}$ elements in the set of 4×1 pre-coding matrixes is to be fed back.

The information to be fed back by UE1 includes: PMI1=13, PMI2=8 and RI=2. UE1 feeds back the information to BS via an uplink feedback channel.

UE2 judges that the rank RI of the downlink channel matrix is 1, determines to use the first criterion, and generates 2 matrix indicators.

UE2 calculates the first matrix indicator PMI1 by formula 1 using $H2_{1\times4}$. $w_b$ is a 4×1 pre-coding matrix. It is supposed that PMI1 is 4, then the $4^{th}$ element in the set of 4×1 pre-coding matrixes is to be fed back.

UE2 calculates the second matrix indicator PMI2 by formula 2 using $H2_{1\times4}$. $w_b$ is a 4×1 pre-coding matrix, $w_{PMI1}$ is the pre-coding matrix indicated by PMI1, ($w_{PMI1}+\alpha w_b$) is an example of $f(w_b)$, $\alpha$ is a predetermined value, which can be set as described above, the description of which is not repeated here. For example, supposing PMI2 is 2, then the 2nd elements in the set of 4×1 pre-coding matrixes is to be fed back.

The information to be fed back by UE2 includes: PMI1=4, PMI2=2 and RI=1. UE2 transmits the information to BS via an uplink feedback channel.

After receiving the feedback information, BS decides by scheduling to use the MU-MIMO transmission mode, and mates UE1 and UE2. The matrix for UE2 obtained by BS is $w2=w_4+\alpha w_2$. UE1 uses the MU-MIMO transmission mode, and the matrix for UE1 may be the pre-coding matrix indicated by the second matrix indicator PMI2, i.e. $w1=w_8$. By the formula $G_{4\times2}=[w1,w2]([w1,w2]^H[w1,w2])^{-1}$, the 4×2 MU-MIMO pre-coding matrix to be used practically may be obtained.

Figure 14:
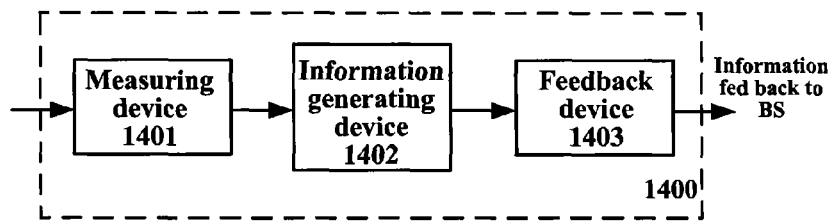
FIG. 14 is a schematic block diagram illustrating the structure of an apparatus of feeding back channel information to a base station according to an embodiment of the disclosure.

FIG. 14 illustrates a codebook based user channel information feedback apparatus according to an embodiment of the disclosure. The apparatus is configured in the terminal node (e.g. UE) of the communication system. As shown in FIG. 14, the apparatus 1400 includes a measuring device 1401, an information calculating device 1402 and a feedback device 1403.

The measuring device 1401 is configured to measure the parameters of the downlink channel between the terminal and the base station of the communication system. The measuring device 1401 may measure the parameters of the downlink channel by using any appropriate method as the method embodiments or examples described above, the description of which is not repeated here. As an example, the measuring device may further estimate the channel matrix of the downlink channel by using the measured parameters.

The information calculating device 1402 is configured to select, from the pre-coding codebook, a plurality of pre-coding matrixes suitable for both the single-user multiple input multiple output transmission mode and the multiple-user multiple input multiple output transmission mode by using the parameters of the downlink channel, to generate the information (the first information) indicating the plurality of pre-coding matrixes. As described above, the pre-coding codebook is a set of pre-coding matrixes, which may be saved in the terminal node and the base station. For example, the pre-coding codebook may be respectively stored in a storage device or a configuration file of the terminal node and may be saved in a storage device or a configuration file of the base station.

The feedback device 1403 is configured to feeds back the first information to the base station. The feedback device may feed back the information by using any appropriate manner, the description of which is not detailed here.

By using the above apparatus, the terminal node can feed back to the base station the information indicating the plurality of pre-coding matrixes which are optimized for both MU-MIMO and SU-MIMO. Therefore, when switching between SU-MIMO and MU-MIMO, the terminal node is not required to retransmit the channel information.

As an example, the first information may include the numbering (also referred to as the matrix indicator) of each of the plurality of pre-coding matrixes in the pre-coding codebook, to reduce the feedback data amount.

Figure 15:
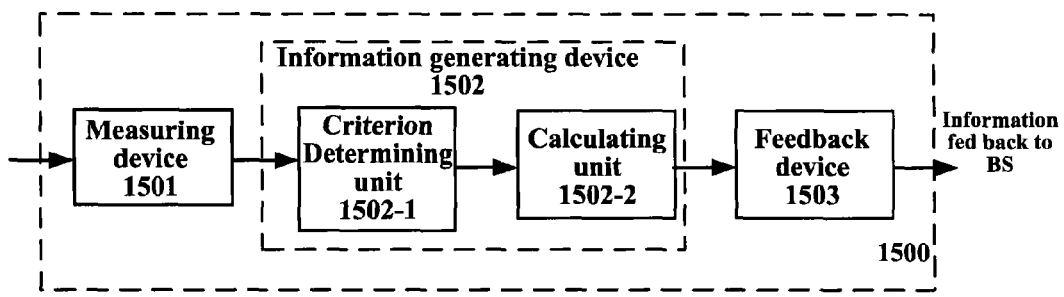
FIG. 15 is a schematic block diagram illustrating the structure of an apparatus of feeding back channel information to a base station according to another embodiment of the disclosure.

FIG. 15 illustrates a codebook based user channel information feedback apparatus 1500 according to an embodiment of the disclosure. The apparatus is provided in the terminal node (e.g. UE) of the communication system. As shown in FIG. 15, the apparatus 1500 includes a measuring device 1501, an information calculating device 1502 and a feedback device 1503. The information calculating device 1502 includes a criterion determining unit 1502-1 and a calculating unit 1502-2.

The criterion determining unit 1502-1 is configured to determine a selection criterion based on the number of data flows that can be received by the terminal node at the same time.

As an example, the criterion determining unit 1502-1 may determine whether the number of data flows that can be received by the terminal node at the same time is 1, and if yes, determine the above described first criterion, as the selection criterion; if no, determine the above described second criterion, as the selection criterion. The criterion determining unit 1502-1 may determine the selection criterion by using any of the methods described above, the description of which is not repeated here.

The calculating unit 1502-2 is configured to calculate, based on the parameters of the downlink channel, a plurality of matrix indicators, each of which corresponds to one of the plurality of pre-coding matrixes. The plurality of matrix indicators is made to meet the selection criterion. And the calculating unit generates the first information including the plurality of matrix indicators.

As an example, the pre-coding matrix corresponding to each of the matrix indicators calculated by the calculating unit 1502-2 meets one of the following conditions: the distance between the pre-coding matrix and the channel matrix is minimum, the distance between the enhancement matrix of the pre-coding matrix and the channel matrix is minimum, or the distance between the pre-coding matrix and the equivalent transformation matrix of the channel matrix is minimum, so that the total throughput of the communication system is maximized.

The calculating unit 1502-2 may calculate the matrix indicators by using any of the methods described above, the description of which is not repeated here.

As an example, the feedback device 1403 or 1503 may further feed back the information indicating the number of data flows that can be received by the terminal node at the same time (e.g. the rank of the estimated channel matrix of the downlink channel) to the base station.

As an example, in the case that other close-ring information transmission mode (e.g. CoMP) is supported, the information calculating device 1402/1502 may further generate feedback information corresponding to the CoMP transmission mode by using the parameters of the downlink channel. And the feedback device 1403/1503 may further return the feedback information corresponding to the CoMP transmission mode to the base station. The information calculating device 1402/1502 may generate different feedback information based on different transmission modes and different channel conditions, the description of which is not detailed here.

Figure 16:
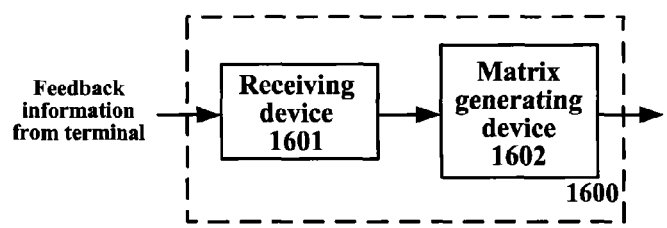
FIG. 16 is a schematic block diagram illustrating the structure of an apparatus of receiving channel information returned from a terminal node according to an embodiment of the disclosure.

FIG. 16 illustrates a codebook based channel information receiving apparatus 1600 according to an embodiment of the disclosure. The apparatus is provided in the base station (e.g. eNodeB) of the communication system. As shown in FIG. 16, the apparatus 1600 includes a receiving device 1601 and a matrix generating device 1602.

The receiving device 1601 is configured to receive the first information a plurality of pre-coding matrixes suitable for both the single-user multiple input multiple output transmission mode and the multiple-user multiple input multiple output transmission mode returned from the terminal node in the communication system. The matrix generating device 1602 is configured to select a plurality of pre-coding matrixes corresponding to the first information from the pre-coding codebook, and generate the third pre-coding matrix for the terminal node by using the plurality of pre-coding matrixes.

In an example, the first information received by the receiving device 1601 may include a plurality of matrix indicator, each of which corresponds to one of the plurality of pre-coding matrixes. In this way, the matrix generating device 1602 may select a plurality of pre-coding matrixes from the pre-coding codebook by using the matrix indicators.

The matrix generating device 1602 may generate the third pre-coding matrix by using any of the above described methods, the description of which is not repeated here.

As an example, the receiving device 1601 may receive feedback information from multiple terminal nodes. For example, the receiving device 1601 may receive the first information indicating a plurality of pre-coding matrixes suitable for both the single-user multiple input multiple output transmission mode and the multiple-user multiple input multiple output transmission mode returned from the first terminal node in the communication system and the fourth information indicating a plurality of pre-coding matrixes suitable for both the single-user multiple input multiple output transmission mode and the multiple-user multiple input multiple output transmission mode returned from the second terminal node. The matrix generating device 1602 may select a plurality of pre-coding matrixes corresponding to the first information from the pre-coding codebook, select a plurality of pre-coding matrixes corresponding to the fourth information from the pre-coding codebook, generate a pre-coding matrix corresponding to the first terminal node by using the plurality of pre-coding matrixes indicated by the first information, and generate a pre-coding matrix corresponding to the second terminal node by using the plurality of pre-coding matrixes indicated by the fourth information. The matrix may be generated by using the method described above, the description of which is not repeated here.

If the base station decides to use multiple-user multiple input multiple output transmission mode and mates the first terminal node and the second terminal node, the matrix generating device 1602 may further generate a pre-coding matrix (the fourth pre-coding matrix) to be used during communication with the two terminal nodes based on the pre-coding matrix corresponding to the first terminal node and the pre-coding matrix corresponding to the second terminal node.

As an example, the matrix generating device 1602 may generate the fourth pre-coding matrix by formula 9b or 9a, or by any other appropriate method, which is not enumerated here.

The above methods, apparatuses and system according to embodiments of the disclosure may be applied to an LTE-A communication system, as the channel information feedback mechanism under SU-MIMO and MU-MIMO transmission mode therein. Particularly, the above methods, apparatuses and system according to embodiments of the disclosure may be used as codebook-based close-ring user channel information feedback mechanism in LTE-A UMTS system.

The above methods, apparatuses and system according to embodiments of the disclosure may be applied in other communication system, such as WiMAX (Worldwide Interoperability for Microwave Access) system, which is not enumerated here.

It should be understood that the above embodiments and examples are illustrative, rather than exhaustive. The present disclosure should not be regarded as being limited to any particular embodiments or examples stated above.

In the above embodiments and examples, the expressions, such as "the first", "the second", and "the third" (e.g. the first matrix indicator, the second matrix indicator, the third information, and the like), are used. Those skilled in the art will appreciate that such expressions are used merely to differentiate the terms in literal, and should not be considered as defining the sequence or the like of the terms.

As an example, the components, units or steps in the above feedback information receiving apparatuses and methods can be configured with software, hardware, firmware or any combination thereof in the main node (e.g. the base station) of the communication network, as part of the physical layer apparatus of the base station. The components, units or steps in the above apparatuses and methods can be configured with software, hardware, firmware or any combination thereof by using any appropriate means or manners known in the art, the description of which is not detailed herein. As an example, the above feedback information receiving apparatuses and methods may be realized in the physical layer apparatus of the base station by modifying the related parts of the base station.

The components, units or steps in the above channel information feedback apparatuses and methods can be configured with software, hardware, firmware or any combination thereof in the terminal node (e.g. UE) of the communication network, as part of the physical layer apparatus of the terminal node. The components, units or steps in the above apparatuses and methods can be configured with software, hardware, firmware or any combination thereof by using any appropriate means or manners known in the art, the description of which is not detailed herein. As an example, the above channel information feedback apparatuses and methods may be realized in the physical layer apparatus of the terminal node by modifying the related parts of the terminal node.

Figure 17:
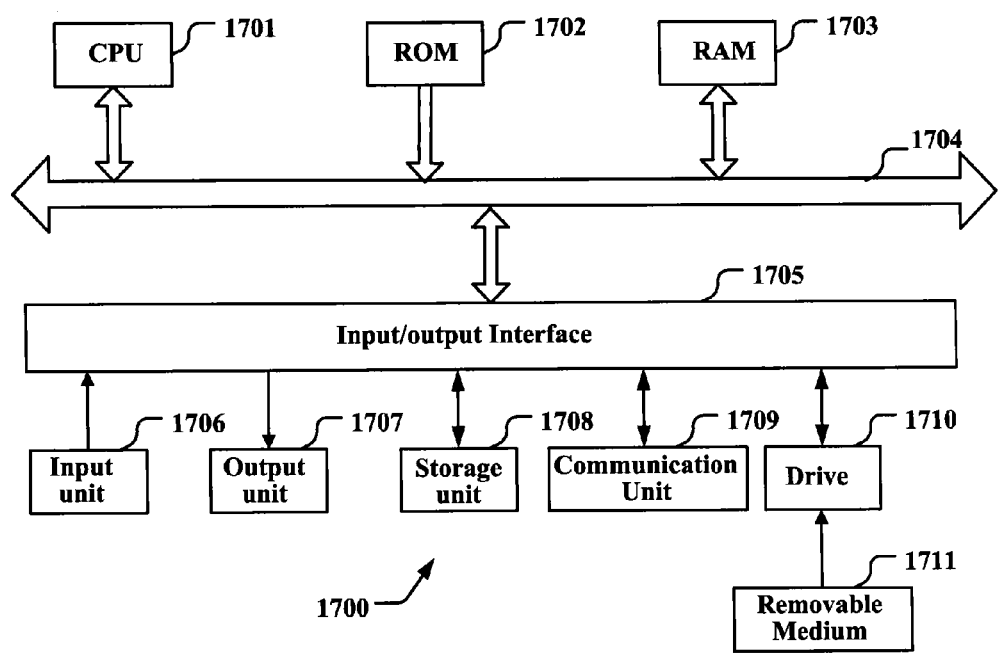
FIG. 17 is schematic diagram illustrating the structure of a computer realizing embodiments of the disclosure.

As an example, in the case of using software or firmware, programs constituting the software for realizing the above method or apparatus can be installed to a computer with a specialized hardware structure (e.g. the general purposed computer 1700 as shown in FIG. 17) from a storage medium or a network. The computer, when installed with various programs, is capable of carrying out various functions.

In FIG. 17, a central processing unit (CPU) 1701 executes various types of processing in accordance with programs stored in a read-only memory (ROM) 1702, or programs loaded from a storage unit 1708 into a random access memory (RAM) 1703. The RAM 1703 also stores the data required for the CPU 1701 to execute various types of processing, as required. The CPU 1701, the ROM 1702, and the RAM 1703 are connected to one another through a bus 1704. The bus 1704 is also connected to an input/output interface 1705.

The input/output interface 1705 is connected to an input unit 1706 composed of a keyboard, a mouse, etc., an output unit 1707 composed of a cathode ray tube or a liquid crystal display, a speaker, etc., the storage unit 1708, which includes a hard disk, and a communication unit 1709 composed of a modem, a terminal adapter, etc. The communication unit 1709 performs communicating processing. A drive 1710 is connected to the input/output interface 1705, if needed. In the drive 1710, for example, removable media 1711 is loaded as a recording medium containing a program of the present invention. The program is read from the removable media 1711 and is installed into the storage unit 1708, as required.

In the case of using software to realize the above consecutive processing, the programs constituting the software may be installed from a network such as Internet or a storage medium such as the removable media 1711.

Those skilled in the art should understand the storage medium is not limited to the removable media 1711, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1702 or the hard disc involved in the storage unit 1708, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disk, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. An electronic device for user equipment in a wireless communication system, the electronic device comprising:
   circuitry configured to
   measure a downlink channel based on a control signaling from a base station;
   determine a number of data flows that can be simultaneously received by the user equipment;
   select two pre-coding matrices from a pre-coding codebook based on a measurement result of the downlink channel and a selection criterion according to the number of data flows;
   determine, for feeding back channel state information to the base station, a first pre-coding matrix indicator and a second pre-coding matrix indicator that correspond to the pre-coding matrices satisfying the selection criterion; and
   apply the first pre-coding matrix indicator and the second pre-coding matrix indicator to an uplink channel of the user equipment to feed back the channel state information,
   wherein in selecting the two pre-coding matrices, the circuitry is further configured to
   generate an estimated downlink channel matrix of the downlink channel based on a pilot signal from the base station, and
   select the two pre-coding matrices based on differences between the estimated downlink channel matrix and the pre-coding matrices in the pre-coding codebook, the differences including a minimum distance between each of the two pre-coding matrices and the estimated downlink channel matrix.

2. The electronic device according to claim 1, wherein the two pre-coding matrices are adapted to a transmission mode.

3. The electronic device according to claim 1, wherein
   the user equipment is served by the base station via a coordinated multi-point (CoMP) transmission scheme, and
   the circuitry is further configured to select the two pre-coding matrices for feeding back channel state information to facilitate the CoMP transmission scheme.

4. The electronic device according to claim 1, wherein the two pre-coding matrices are applicable for single-user multiple input multiple output (SU-MIMO) transmission and multi-user multiple input multiple output (MU-MIMO) transmission to facilitate dynamic switching between the SU-MIMO transmission and the MU-MIMO transmission.

5. The electronic device according to claim 1, wherein
   the electronic device is the user equipment, and
   the electronic device further comprises multiple antennas that are configured to transmit the first and second pre-coding matrix indicators corresponding to the two pre-coding matrices satisfying the selection criterion to the base station.

6. The electronic device according to claim 1, wherein
   the electronic device is the base station, and
   the electronic device further comprises multiple antennas that are configured to receive the first and second pre-coding matrix indicators corresponding to the pre-coding matrices satisfying the selection criterion to the base station.

7. The electronic device according to claim 1, wherein the circuitry is further configured to select the first pre-coding matrix indicator and the second pre-coding matrix indicator on a same number of data flows based on a same codebook.

8. The electronic device according to claim 1, wherein the circuitry is further configured to
   set a first selection criterion in response to the determined number of data flows being equal to one data flow; and
   set a second selection criterion in response to the determined number of data flows being greater than one data flow.

9. A method for user equipment in a wireless communication system, the method comprising:
   measuring a downlink channel based on a control signaling from a base station;
   determining a number of data flows that can be simultaneously received by the user equipment;
   selecting, by circuitry, two pre-coding matrices from a pre-coding codebook based on a measurement result of the downlink channel and a selection criterion according to the number of data flows;
determining, by the circuitry for feeding back channel state information to the base station, a first pre-coding matrix indicator and a second pre-coding matrix indicator that correspond to the pre-coding matrices satisfying the selection criterion; and
applying, by the circuitry, the first pre-coding matrix indicator and the second pre-coding matrix indicator to an uplink channel of the user equipment to feed back the channel state information,
wherein the selecting of the two pre-coding matrices is performed by
generating an estimated downlink channel matrix of the downlink channel based on a pilot signal from the base station, and
selecting the two pre-coding, matrices based on differences between the estimated downlink channel matrix and the pre-coding matrices in the pre-coding codebook, the differences including a minimum distance between each of the two pre-coding matrices and the estimated downlink channel matrix.

10. A non-transitory computer readable medium having instructions stored therein that, when executed by processing circuitry, cause the processing circuitry to perform a method for a wireless communication system, the method comprising:
measuring a downlink channel based on a control signaling from a base station;
determining a number of data flows that can be simultaneously received by the user equipment;
selecting two pre-coding matrices from a pre-coding codebook based on a measurement result of the downlink channel and a selection criterion according to the number of data flows;
determining, for feeding back channel state information to the base station, a first pre-coding matrix indicator and a second pre-coding matrix indicator that correspond to the pre-coding matrices satisfying the selection criterion; and
applying the first pre-coding matrix indicator and the second pre-coding matrix indicator to an uplink channel of the user equipment to feed back the channel state information,
wherein the selecting of the two pre-coding. matrices is performed by
generating an estimated downlink channel matrix of the downlink channel based on a pilot signal from the base station, and
selecting the two pre-coding matrices based on differences between the estimated downlink channel matrix and the pre-coding matrices in the pre-coding codebook, the differences including a minimum distance between each of the two pre-coding matrices and the estimated downlink channel matrix.

11. An electronic device for a base station in a wireless communication system, the electronic device comprising:
circuitry, configured to
acquire a first pre-coding matrix indicator and a second pre-coding matrix indicator from an uplink channel of user equipment;
determine, from a pre-coding codebook, a first pre-coding matrix that corresponds to the first pre-coding matrix indicator and a second pre-coding matrix that corresponds to the second pre-coding matrix indicator; and
generate a third pre-coding matrix for the user equipment based on the first pre-coding matrix and the second pre-coding matrix, wherein
the first pre-coding matrix and the second pre-coding matrix are selected by the user equipment based on a measurement result of a downlink channel between the base station and the user equipment, and a selection criterion according to number of data flows that can be simultaneously received by the user equipment, which generates an estimated downlink channel matrix of the downlink channel based on a pilot signal from the base station, and selects the first pre-coding matrix and the second pre-coding matrix based on differences between the first pre-coding matrix and the second pre-coding matrix, and the estimated downlink channel matrix, the differences including a minimum distance between each of the two pre-coding matrices and the estimated downlink channel matrix.

12. The electronic device according to claim 11, wherein the first pre-coding matrix and the second pre-coding matrix are adapted to a transmission mode.

13. The electronic device according to claim 11, wherein
the base station serves the user equipment via a coordinated multi-point (COMP) transmission scheme, and
the circuitry is further configured to generate the third pre-coding matrix based on the first pre-coding matrix and the second pre-coding matrix to facilitate the CoMP transmission scheme.

14. The electronic device according to claim 11, wherein the first pre-coding matrix and the second pre-coding matrix are applicable for single-user multiple input multiple output SU-MIMO) transmission and multi-user multiple input multiple output (MU-MIMO) transmission to facilitate dynamic switching between the SU-MIMO transmission and the MU-MIMO transmission.

15. The electronic device according to claim 11, wherein the circuitry is further configured to select the first pre-coding matrix indicator and the second pre-coding matrix indicator on a same number of data flows based on a same codebook.

16. A method for a base station in a wireless communication system, the method comprising:
acquiring a first pre-coding matrix indicator and a second pre-coding matrix indicator from an uplink channel of user equipment;
determining, by circuitry from a pre-coding codebook, a first pre-coding matrix that corresponds to the first pre-coding matrix indicator and a second pre-coding matrix that corresponds to the second pre-coding matrix indicators indicator; and
generating, by the circuitry, a third pre-coding matrix for the user equipment based on the first pre-coding matrix and the second pre-coding matrix, wherein
the first pre-coding matrix and the second pre-coding matrix are selected by the user equipment based on a measurement result of a downlink channel between the base station and the user equipment, and a selection criterion according to number of data flows that can be simultaneously received by the user equipment, selection of the first pre-coding matrix and the second pre-coding matrix being performed by
generating an estimated downlink channel matrix of the downlink channel based on a pilot signal from the base station, and
selecting the first pre-coding matrix and the second pre-coding matrix based on differences between the first pre-coding matrix and the second pre-coding matrix, and the estimated downlink channel matrix, the differences including a minimum distance between each of the two pre-coding matrices and the estimated downlink channel matrix.

17. A non-transitory computer readable medium having instructions stored therein that, when executed by processing circuitry, cause the processing circuitry to perform a method for a wireless communication system, the method comprising:
  acquiring a first pre-coding matrix indicator and a second pre-coding matrix indicator from an uplink channel of user equipment;
  determining, from a pre-coding codebook, a first pre-coding matrix that corresponds to the first pre-coding matrix indicator and a second pre-coding matrix that corresponds to the second pre-coding matrix indicators indicator; and
  generating a third pre-coding matrix for the user equipment based on the first pre-coding matrix and the second pre-coding matrix, wherein
  the first pre-coding matrix and the second pre-coding matrix are selected by the user equipment based on a measurement result of a downlink channel between the base station and the user equipment, and a selection criterion according to number of data flows that can be simultaneously received by the user equipment, selection of the first pre-coding matrix and the second pre-coding matrix being performed by
  generating an estimated downlink channel matrix of the downlink channel based on a pilot signal from the base station, and
  selecting the first pre-coding matrix and the second pre-coding matrix based on differences between the first pre-coding matrix and the second pre-coding matrix, and the estimated downlink channel matrix, the differences including a minimum distance between each of the two pre-coding matrices and the estimated downlink channel matrix.

* * * * *